United States Patent
Evans, Jr. et al.

(10) Patent No.: US 9,062,412 B2
(45) Date of Patent: *Jun. 23, 2015

(54) TEXTILE BACKING FORMED FROM RECYCLED MATERIALS

(71) Applicant: Tandus Flooring, Inc., Dalton, GA (US)

(72) Inventors: Paul D. Evans, Jr., Sugar Valley, GA (US); Gabe Moore, Acworth, GA (US)

(73) Assignee: Tandus Flooring, Inc., Dalton, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/153,364

(22) Filed: Jan. 13, 2014

(65) Prior Publication Data

US 2014/0128548 A1 May 8, 2014

Related U.S. Application Data

(62) Division of application No. 13/113,345, filed on May 23, 2011, now Pat. No. 8,669,297.

(60) Provisional application No. 61/347,599, filed on May 24, 2010, provisional application No. 61/347,602, filed on May 24, 2010, provisional application No. 61/413,528, filed on Nov. 15, 2010.

(51) Int. Cl.
| | |
|---|---|
| *C08J 11/04* | (2006.01) |
| *D06N 7/00* | (2006.01) |
| *B29B 17/00* | (2006.01) |
| *B29L 31/00* | (2006.01) |

(52) U.S. Cl.
CPC .......... *D06N 7/0076* (2013.01); *B29B 17/0042* (2013.01); *B29L 2031/7322* (2013.01); *D06N 2205/10* (2013.01); *D06N 2205/18* (2013.01); *D06N 2205/04* (2013.01); *D06N 2203/048* (2013.01); *D06N 7/0081* (2013.01); *D06N 2205/026* (2013.01)

(58) Field of Classification Search
CPC . D06N 7/0036; D06N 7/0063; D06N 7/0076; D06N 2201/0236; D06N 7/0081; D06N 2205/10; D06N 2205/026; D06N 2205/04; D06N 2205/18; B29B 17/0026; B29B 17/0042; B29L 2031/7322
USPC .......... 521/40, 40.5, 46, 46.5, 48, 50; 525/50, 525/55, 60, 239; 428/85, 95, 96, 97; 528/480, 502 R, 502 F, 503
See application file for complete search history.

(56) References Cited

U.S. PATENT DOCUMENTS

| | | |
|---|---|---|
| 5,656,109 A | 8/1997 | Schilling et al. |
| 5,704,104 A | 1/1998 | Bacon et al. |

(Continued)

FOREIGN PATENT DOCUMENTS

| | | |
|---|---|---|
| EP | 0 867 557 A2 | 9/1998 |
| EP | 0 943 728 A1 | 9/1999 |

(Continued)

*Primary Examiner* — Frances Tischler
(74) *Attorney, Agent, or Firm* — Womble Carlyle Sandridge & Rice LLP (57) ABSTRACT

Backings for carpet and carpet tiles are formed from various post-consumer and/or post-industrial polymeric waste materials, for example, post-consumer textile waste material (e.g., carpet and carpet tiles), post-industrial textile waste material (e.g., carpet and/or carpet tiles), and/or other post-consumer and/or post-industrial polymeric materials.

22 Claims, 5 Drawing Sheets

(56) References Cited

U.S. PATENT DOCUMENTS

| | | |
|---|---|---|
| 5,728,741 A | 3/1998 | Zegler et al. |
| 5,855,981 A | 1/1999 | Zegler et al. |
| 5,897,066 A | 4/1999 | Bacon et al. |
| 5,914,353 A | 6/1999 | Grizzle et al. |
| 6,228,479 B1 | 5/2001 | Zegler et al. |
| 6,406,574 B1 | 6/2002 | Hammel et al. |
| 6,860,953 B1 | 3/2005 | Grizzle et al. |
| 8,669,297 B2 | 3/2014 | Evans, Jr. |
| 2003/0209306 A1 | 11/2003 | Jones et al. |
| 2004/0062903 A1 | 4/2004 | Evans et al. |
| 2004/0224589 A1 | 11/2004 | Bacon et al. |
| 2005/0249911 A1 | 11/2005 | Randall et al. |
| 2005/0249912 A1 | 11/2005 | Randall et al. |
| 2008/0271840 A1 | 11/2008 | Randall et al. |
| 2009/0226662 A1 | 9/2009 | Dyczko-Riglin et al. |

FOREIGN PATENT DOCUMENTS

| | | |
|---|---|---|
| WO | WO 99/40250 A2 | 8/1999 |
| WO | WO 02/102582 A2 | 12/2002 |
| WO | WO 2005/116325 A2 | 12/2005 |
| WO | PCT/US2011/037564 | 10/2012 |
| WO | PCT/US2011/037564 | 11/2012 |

TEXTILE BACKING FORMED FROM RECYCLED MATERIALS

CROSS-REFERENCE TO RELATED APPLICATIONS

This application is a divisional of U.S. patent application Ser. No. 13/113,345, filed May 23, 2011, now U.S. Pat. No. 8,669,297, which claims the benefit of U.S. Provisional Application No. 61/347,599, filed May 24, 2010, U.S. Provisional Application No. 61/347,602, filed May 24, 2010, and U.S. Provisional Application No. 61/413,528, filed Nov. 15, 2010. All of the above applications are incorporated by reference herein in their entirety.

BACKGROUND

There is a continuing need to increase the recycled content of flooring products, for example, carpet and carpet tiles. There is a particular need to increase the post-consumer recycled content of such products. There is a further need to use post-consumer carpet roll goods and/or post-consumer carpet tiles in such flooring products to reduce the amount of post-consumer carpet and carpet tiles that are sent to landfills.

SUMMARY

In some aspects, this disclosure is directed generally to backings for textile flooring products, for example, carpet roll goods (i.e., carpet) and/or carpet tiles, and methods of making the backings. More particularly, this disclosure is directed to textile backings comprising recycled materials, for example, post-consumer carpet, post-consumer carpet tiles, and/or post-industrial materials, and methods of making the textile backings from the recycled materials. This disclosure is also directed to carpet and carpet tile including the backings, and methods of making the carpet and carpet tile including the backings.

Notably, the textile backings of the present invention include increased post-consumer recycled content, for example, post-consumer recycled textile and/or textile backing content, as compared with conventional backings for carpet roll goods and carpet tiles. In this manner, the amount of virgin material and/or post-industrial materials may be reduced.

Other features, aspects, and advantages of the present invention will be apparent from the following description and accompanying figures.

BRIEF DESCRIPTION OF THE DRAWINGS

The description refers to the accompanying schematic drawings in which like reference characters refer to like parts throughout the several views, and in which.

DESCRIPTION

Various aspects of the invention may be understood further by referring to the figures. For purposes of simplicity, like numerals may be used to describe like features. It will be understood that where a plurality of similar features are depicted, not all of such features necessarily are labeled on each figure. Further, while only certain combinations of features are illustrated herein, numerous other combinations and configurations are contemplated hereby. It will be understood that any of the various methods and/or processes described herein may include a fewer number of steps, greater number of steps, or may include different steps than those schematically illustrated. The illustrated methods and/or processes are provided merely to facilitate understanding of various aspects of the invention, and are not intended to be limiting in any manner.

Figure 1A:
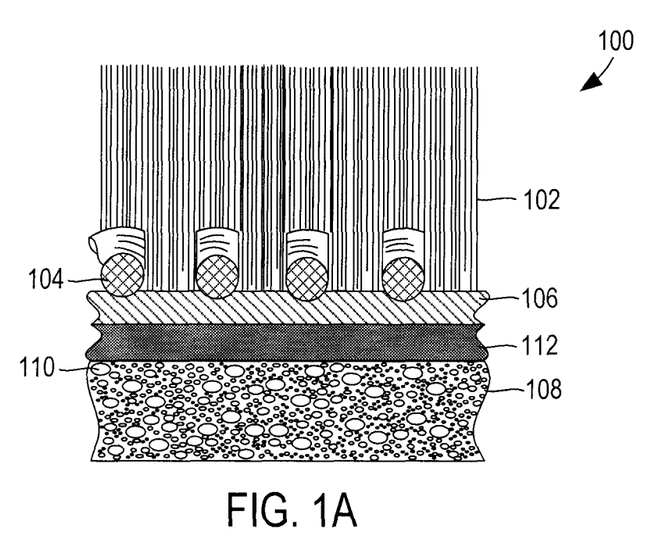
FIG. 1A is a schematic cross-sectional view of an exemplary carpet roll good, including a backing.

FIG. 1A schematically illustrates a cross-sectional view of an exemplary textile product 100, for example, carpet (e.g., carpet roll good). The carpet 100 generally includes a plurality of tufted pile yarns 102 that define an upper side or face of the carpet. The pile yarns 102 may be cut to form cut pile tufts as illustrated in FIG. 1A or may be left as uncut loops. The yarns 102 may be looped through a tufting primary 104, which generally may comprise a woven or nonwoven scrim material (e.g., a nylon/polyester nonwoven) or other suitable material. A pre-coat layer 106 (e.g., a vinyl acetate ethylene copolymer or other suitable polymeric material) may be used to secure the pile yarns 102 to the tufting primary 104. A backing 108 may be adhered to the pre-coat layer 106 and/or tufting primary 104 using any suitable technique, for example, lamination, adhesive, stitching, or otherwise. In some embodiments, a layer of plastisol 112 (e.g., virgin PVC plastisol) may be disposed between the pre-coat layer 106 and backing 108. However, other suitable constructions and materials are contemplated.

The backing 108 may comprise any suitable material, and in some instances, may comprise a flexible polymeric matrix comprising, for example, polyvinyl chloride (PVC). In the exemplary structure shown in FIG. 1A, the backing 108 comprises a closed cell foam including a plurality of gas pockets or cells 110. The cells 110 may be voids or may contain air or gases, such as decomposition products of a foaming agent and/or blowing agent. However, in other embodiments, the backing 108 may be an open cell structure or a combination of open and closed cells. The backing 108 may serve as a resilient cushion that will compress under an external load and recover when the load is removed. In general, the greater the percentage of closed cells in the structure, the better the cushioning properties of the backing and/or the better moisture resistance. While the use of foam (i.e., foamed) backings is described in detail herein, it should be understood that non-foam (i.e., non-foamed) backings also may be used.

If desired, the backing 108 may include a reinforcing layer or material (not shown in FIG. 1A). The reinforcing layer may comprise a nonwoven scrim, fiberglass mesh, or any other suitable material. The reinforcing layer or material may be embedded within the backing or may be joined to one or both faces of the backing.

The carpet backing (e.g., backing for carpet roll goods) may include up to 100% recycled content, for example, from about 80 to 100 wt %, for example, from about 90 to about 98 wt %, for example, about 95 wt % recycled content. However, it will be appreciated that other amounts of recycled content and ranges thereof are contemplated hereby. The recycled content may include various post-consumer and/or post-industrial polymeric waste materials, for example, post-consumer textile waste material (e.g., post-consumer carpet and carpet tiles), post-industrial textile waste material (e.g., post-industrial carpet and/or carpet tiles), and/or other post-consumer and/or post-industrial polymeric materials. Such materials may comprise PVC and/or any other suitable material.

In some embodiments, the carpet backing may include one or more components that comprise virgin materials. For example, the backing may include a mesh reinforcing layer (e.g., scrim, not shown in FIG. 1A) and/or a resinous or polymeric blowing agent, either or both of which may comprise virgin materials. In such embodiments, the mesh reinforcing layer may comprise from about 1 to about 5 wt % of the backing, for example, about 2 to about 4 wt % of the backing, for example, about 3 wt % of the backing. The blowing agent may comprise from about 1 to about 3 wt % of the backing, for example, about 2 wt % of the backing. Thus, where both components are present, the mesh reinforcing layer and blowing agent may collectively comprise from about 2 to about 8 wt % of the backing, for example, from about 3 to about 7 wt % of the backing, for example, about 5 wt % of the backing. It is also contemplated that the reinforcing layer and/or blowing agent may comprise recycled post-industrial and/or post-consumer materials.

In one aspect, the carpet backing may include from greater than about 27 to 100 wt % post-consumer textile content (e.g., post-consumer textile waste materials including post-consumer carpet roll goods and/or carpet tiles), and in one particular example, the backing may include 100 wt % post-consumer textile content. In each of various other independent examples, the backing may include from about 30 to 100 wt %, from about 40 to about 98 wt %, from about 50 to about 75 wt %, or from about 55 to about 60 wt %, for example, about 57 wt %, post-consumer textile content. Thus, in some exemplary embodiments, the backing may comprise from about 30 to 100% post-consumer textile content and from 0 to about 70 wt % post-industrial content, from about 40 to about 98 wt % post-consumer textile content and from about 2 to about 60 wt % post-industrial content, from about 50 to about 75 wt % post-consumer textile content and from about 25 to about 50 wt % post-industrial content, or from about 55 to about 60 wt % post-consumer content and from about 40 to about 45 wt % post-industrial content, for example, about 57 wt % post-consumer textile content and about 43 wt % post-industrial content. However, other compositions are contemplated. Further, where a virgin mesh reinforcing layer and/or virgin blowing agent is used, it will be understood that the wt % values above (and ranges thereof) may exclude such components, such that the wt % value may refer to the remaining content of the backing.

In another aspect, the carpet backing may include from greater than about 16 to 100 wt % post-consumer textile backing (e.g., from post-consumer carpet and/or carpet tile), and in one particular example, the carpet backing may include 100 wt % post-consumer textile backing. In each of various other independent examples, the backing may include from about 20 to 100 wt %, from about 40 to about 98 wt %, from about 45 to about 95 wt %, or from about 50 to about 70 wt %, for example, about 55 wt %, post-consumer textile backing content. However, other wt % values and ranges thereof may be used. Further, where a virgin mesh reinforcing layer and/or virgin blowing agent is used, it will be understood that the wt % values above (and ranges thereof) may exclude such components, such that the wt % value may refer to the remaining content of the backing.

Countless methods and/or processes may be used to form the carpet backing. In one exemplary process schematically illustrated in FIG. 1B, post-industrial polyvinyl chloride (PI-PVC) pellets (e.g., post-industrial polymeric waste material comprising PVC), recycled post-consumer PVC backing (PC-PVC) from carpet tiles and/or carpet roll goods (e.g., post-consumer textile waste material comprising PVC), and optionally, a blowing agent may be fed into an extruder (with any other additives) and heated to form an extrudable mixture or composition.

Figure 1B:
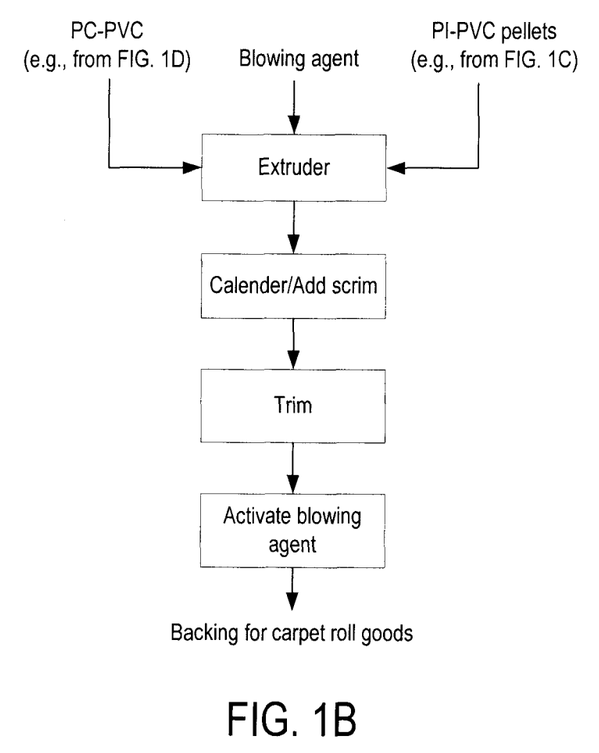
FIG. 1B schematically illustrates an exemplary process or method for making a textile backing (e.g., the carpet backing of FIG. 1A), using post-industrial PVC (PI-PVC) pellets and post-consumer PVC backing (PC-PVC)

The extrudable mixture may then be extruded as a rope, calendered (optionally with a nonwoven scrim or fiberglass mesh reinforcing layer) to form a sheet, and trimmed as needed. The blowing agent (where used) may then be activated by passing the sheet through an oven at a temperature above the activation temperature of the blowing agent to form the carpet backing (e.g., for carpet roll goods). In one example, the blowing agent may comprise azodicarbonamide, which has an activation temperature of about 350-395° F. However, other blowing agents may be used.

The PI-PVC, PC-PVC, and optional blowing agent may be combined in any suitable relative amounts. In each of various independent examples, the extrudable mixture or composition may include from 0 to about 3 wt % blowing agent, and the remainder may comprise from 0 to about 60 wt % PI-PVC and from about 40 to 100 wt % PC-PVC, from 0 to about 45 wt % PI-PVC and from about 55 to 100 wt % PC-PVC, from 0 to about 39 wt % PI-PVC and from about 59 to 100 wt % PC-PVC, or any other suitable composition. In other examples, the extrudable mixture or composition may include from 0 to about 60 wt % PI-PVC, from about 40 to about 98 wt % PC-PVC, and about 2 wt % blowing agent; from 0 to about 45 wt % PI-PVC, from about 55 to about 98 wt % PC-PVC, and about 2 wt % blowing agent; or from 0 to about 39 wt % PI-PVC, from about 59 to about 98 wt % PC-PVC, and about 2 wt % blowing agent. In one particular example, the extrudable mixture or composition may include about 39 wt % PI-PVC, about 59 wt % PC-PVC, and about 2 wt % blowing agent. In another particular example, the extrudable mixture or composition may comprise about 98 wt % PC-PVC and about 2 wt % blowing agent. However, countless other compositions may be suitable.

The composition of the resulting carpet backing may likewise vary. In each of various independent examples, the backing may include from 0 to about 3 wt % blowing agent and from 0 to about 4 wt % reinforcing layer, and the remainder of the backing may include from 0 to about 60 wt % PI-PVC and from about 40 to 100 wt % PC-PVC, from 0 to about 45 wt % PI-PVC and from about 55 to 100 wt % PC-PVC, or from 0 to about 39 wt % PI-PVC and from about 59 to 100 wt % PC-PVC. In one particular example, the backing may comprise from 0 to about 60 wt % PI-PVC, from about 40 to 95 wt % PC-PVC, about 2 wt % blowing agent, and about 3 wt % reinforcing layer. In another particular example, the backing may comprise from 0 to about 40 wt % PI-PVC, from about 60 to 95 wt % PC-PVC, about 2 wt % blowing agent, and about 3 wt % reinforcing layer. In yet another example, the backing may comprise from 0 to about 38 wt % PI-PVC, from about 57 to 95 wt % PC-PVC, about 2 wt % blowing agent, and about 3 wt % reinforcing layer. However, numerous other carpet backing compositions are contemplated hereby.

It is contemplated that in some embodiments, the PI-PVC may be omitted entirely, such that the backing comprises up to 100% PC-PVC. However, it is believed that the use of the PI-PVC may provide some benefit in certain backings. While not wishing to be bound by theory, it is believed that the presence of the PI-PVC in some backings may help to allow uniform expansion of the blowing agent and may also assist with providing a moisture barrier in the backing 110 via control of the cell structure.

Figure 1C:
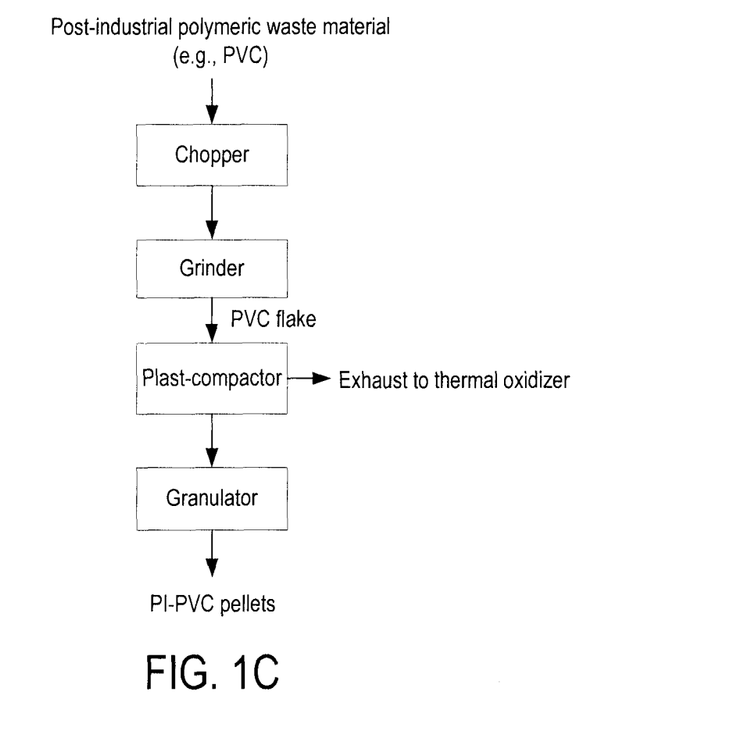
FIG. 1C schematically illustrates an exemplary process or method for making PI-PVC pellets, which may be used with the exemplary process of FIG. 1B.

The PI-PVC pellets may be derived from any suitable source. For example, the PI-PVC pellets may comprise post-industrial pool liner, meat wrap, automotive scrap (e.g., door panels), or any other suitable post-industrial polymeric waste material comprising PVC. In one exemplary process illustrated schematically in FIG. 1C, the incoming post-industrial polymeric waste materials may be chopped, ground, compacted, and/or granulated as needed to form pellets or chips. It will be appreciated that the degree of processing needed to form the PI-PVC pellets may vary, depending on the condition and/or quality of the incoming raw materials being used. Thus, countless other processes are contemplated hereby. In some embodiments, the resulting PI-PVC may comprise 100 wt % compounded PVC (i.e., PVC plus any fillers and/or additives). However, other possibilities are contemplated.

Likewise, the PC-PVC may be derived from any suitable source. For example, the PC-PVC may be obtained from post-consumer textile waste material (e.g., post-consumer carpet tiles and/or post-consumer carpet roll goods having a backing comprising PVC) using an elutriation process (in which recycled carpet is chopped, ground, and processes in multiple elutriators to separate the backing from the fibers), a shearing process (in which the fibers are sheared from the backing), a splitting process (in which the face construction is mechanically separated or split from the backing material), a chemical dissolution process (in which the fibers are removed using a solvent), a chemical separation process (in which the intermediate layers are separated from one another), or any other suitable process or technique.

In one example, the PC-PVC may be recovered from post-consumer textile waste material (e.g., post-consumer carpet tiles and/or post-consumer carpet roll goods) using a mechanical separating apparatus, for example, a shredding apparatus coupled with separators that separate the fiber fluff from the backing. One example of such an apparatus that may be suitable is disclosed in U.S. Pat. No. 5,897,066. However, other apparatuses with a fewer or greater number of shredders or shredding cylinders may be used, and any of such cylinders may rotate in any suitable direction. For example, in one embodiment, a four-cylinder shredder may be used, where the first three rolls rotate in one direction and the fourth roll rotates in the opposite direction. Other suitable shredders may include three, four, five, or more cylinders having various configurations. Countless other possibilities are contemplated, and the use of other mechanical and/or chemical separating equipment is contemplated hereby.

Figure 1D:
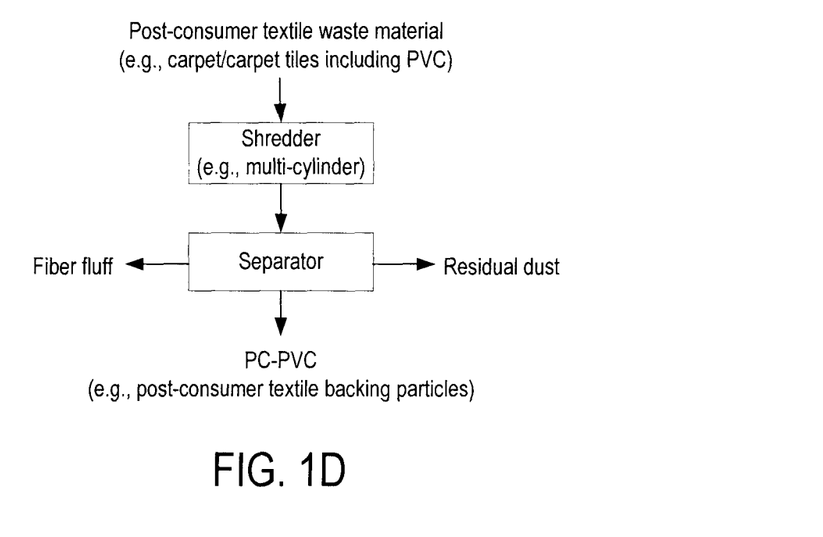
FIG. 1D schematically illustrates an exemplary process or method for making PC-PVC, which may be used with the exemplary process of FIG. 1B.

As schematically illustrated in FIG. 1D, in such a process, the incoming post-consumer carpet and/or carpet tiles are fed to a shredder, where the size of the carpet and/or carpet tiles is reduced and at least a portion of the fibers are pulled away from the backing (typically PVC backing). The backing (e.g., PVC) and fiber or fiber fluff (e.g., nylon) may then be separated (e.g., using a cyclone separator, elutriator, or any other suitable process, method, or apparatus) to recover the PC-PVC, which includes the backing and, in some cases, a small amount of fiber or fiber fluff.

In one embodiment, the PC-PVC comprises at least about 80 wt % post-consumer textile backing, for example, at least about 85 wt % post-consumer textile backing, at least about 90 wt % post-consumer textile backing, for example, at least about 95 wt % post-consumer textile backing, such that the PC-PVC respectively comprises less than about 20 wt % fiber, for example, less than about 15 wt % fiber, for example, less than about 10 wt % fiber, for example, less than about 5% fiber. The backing may substantially comprise PVC compounded with additives and/or filler, so that the PC-PVC comprises at least about 85 wt % compounded PVC, for example, at least about 90 wt % compounded PVC, for example, at least about 95 wt % compounded PVC. However, the use of PC-PVC containing other amounts of backing, compounded PVC, and/or fiber is contemplated.

In one embodiment, the backing may be bonded to a separate face construction that has previously been coated with latex precoat and a PVC plastisol layer. To do so, the PVC plastisol layer and the backing may be heated together in a nip. The resulting carpet may then be rolled and/or cut into smaller rolls, for example, six foot width carpet rolls.

Notably, the present process and resulting backing are able to utilize a greater percentage of post-consumer textile materials, and more particularly, post-consumer textile backing, than conventional processes, as will be discussed in connection with the examples.

Figure 2A:
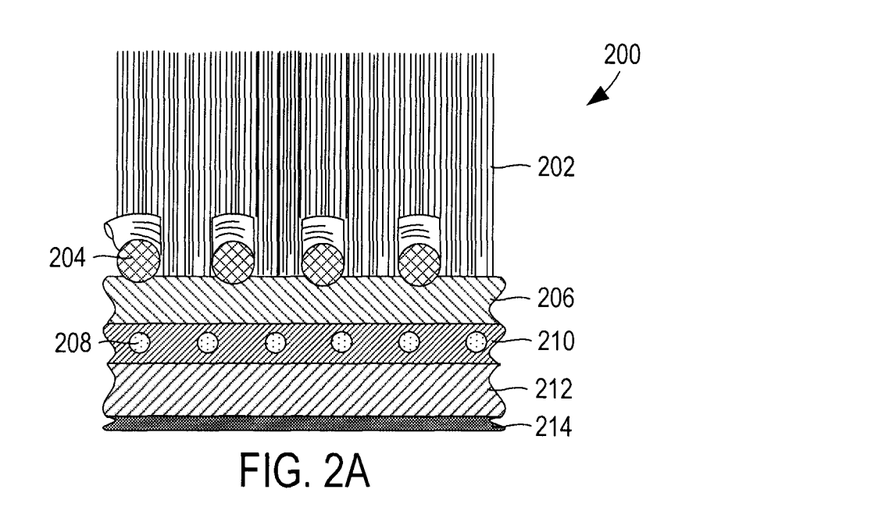
FIG. 2A is a schematic cross-sectional view of an exemplary carpet tile, including a backing.

FIG. 2A schematically illustrates a cross-sectional view of another exemplary textile product 200, for example, a carpet tile. The carpet tile 200 generally includes a plurality of tufted pile yarns 202 that define an upper side or face of the carpet tile. The pile yarns 202 may be cut to form cut pile tufts as illustrated in FIG. 2A or may be left as uncut loops. The yarns 202 may be secured to a tufting primary 204, which generally may comprise a woven or nonwoven material (e.g., a nylon/polyester nonwoven) or other suitable material using a precoat layer 206 (e.g., a latex or other suitable polymeric material). The carpet tile may also include a layer of scrim 208 (e.g., a nonwoven fiberglass scrim) or other reinforcing material coated (e.g., on both sides) with a plastisol 210 (e.g., virgin PVC plastisol). A backing 212 may be joined to the scrim/plastisol using any suitable technique. The tile may also include a barrier coating 214 (e.g., a polymeric material or other suitable material) on a side of the backing distal from the pile yarns. The barrier coating may define at least a portion of a lower side (i.e., bottom surface) of the carpet tile. The backing 212 may comprise any suitable material, and in some instances, may comprise a polymeric material, for example, PVC. However, other possibilities are contemplated.

In one aspect, a carpet tile backing may include up to 100% recycled content. In each of various independent examples, the backing may include at least about 85 wt % recycled content, at least about 90 wt % recycled content, or at least about 95 wt % recycled content, and in example, the backing includes 100 wt % recycled content. However, it will be appreciated that other wt % values and ranges thereof are contemplated hereby. The recycled content may include various post-consumer and/or post-industrial polymeric waste materials, for example, post-consumer textile waste material (e.g., carpet and carpet tiles), post-industrial textile waste material (e.g., carpet and/or carpet tiles), and/or other post-consumer and/or post-industrial polymeric materials. Such materials may comprise PVC and/or any other suitable material.

In another aspect, the carpet tile backing may include greater than about 60 wt % post-consumer textile content (e.g., post-consumer textile waste materials including post-consumer carpet roll goods and/or carpet tiles). In each of various independent examples, the backing may include from about 70 to 100 wt % post-consumer textile content, from about 80 to 100 wt % post-consumer textile content, from about 88 to 100 wt % post-consumer textile content, or from about 90 to 98 wt % post-consumer textile content, for example, about 97% post-consumer textile content. However, other possibilities are contemplated hereby.

The remainder of the backing may comprise post-industrial content (e.g., post-industrial textile waste materials including post-industrial carpet roll goods and/or carpet tiles), other post-industrial polymeric waste materials, and/or virgin materials. Thus, in each of various independent examples, the carpet tile backing may include from about 70 to 100 wt % post-consumer textile content and from 0 to about 30 wt % post-industrial content, from about 80 to 100 wt % post-consumer textile content and from 0 to about 20 wt % post-industrial content, from about 88 to 100 wt % post-consumer textile content and from 0 to about 12 wt % post-industrial content, or from about 90 to 98 wt % post-consumer textile content and from about 2 to about 10 wt % post-industrial content, for example, about 97% post-consumer textile content and about 3 wt % post-industrial content. However, other wt % values and ranges thereof are contemplated.

In another aspect, a backing for carpet tile may include greater than about 35 to 100 wt % post-consumer textile backing (e.g., from post-consumer carpet and/or carpet tile). In some independent examples, the carpet tile backing may include from about 40 to 100 wt % post-consumer textile backing, from about 50 to about 99 wt % post-consumer textile backing, or from about 60 to about 90 wt % post-consumer textile backing, for example, about 88 wt % post-consumer textile backing. However, other wt % values and ranges thereof may be used.

Countless methods and/or processes may be used to form the carpet tile backing. In one exemplary process schematically illustrated in FIG. 2B, recycled carpet (RC) pellets (derived from blended post-consumer and/or post-industrial textile waste materials, e.g., carpet roll goods and/or carpet tiles, as will be described below), and recycled post-consumer PVC backing (PC-PVC) (derived from post-consumer carpet tiles and/or carpet roll goods) are fed into an extruder (with any other additives) and heated to form an extrudable mixture or composition. The extrudable mixture may then be extruded as a rope, calendered to form a sheet, and trimmed as needed. A barrier coating then may be applied to the backing and cured.

The RC pellets and PC-PVC may be combined in any suitable amount. In one example, the extrudable mixture or composition (and resulting backing) may include from 0 to about 40 wt % RC pellets and from about 60 to 100 wt % PC-PVC, from 0 to about 25 wt % RC pellets and from about 75 to 100 wt % PC-PVC, or from 0 to about 10 wt % RC pellets and from about 90 to 100 wt % PC-PVC. In one particular example, the extrudable mixture or composition (and resulting backing) may include 100 wt % PC-PVC. However, other suitable compositions are contemplated by this disclosure.

The RC pellets may be formed using any suitable process. In one exemplary process illustrated schematically in FIG. 2C, post-consumer and/or post-industrial textile waste materials, e.g., carpet roll goods and/or carpet tiles may be fed to a shredder. The shredded carpet may then be fed to a granulator to form a carpet fluff. The carpet fluff may then be fed to a plant-compactor (e.g., a feed screw compactor), where the carpet fluff is rolled and/or compressed into pellets or other shapes. The exhaust from the plast-compactor may be sent to a thermal oxidizer.

The RC pellets may comprise from about 50 to 100 wt % post-consumer content and from 0 to about 50 wt % post-industrial content, and in some particular examples, may include about 50 wt % post-consumer and about 50 wt % post-industrial content, about 60 wt % post-consumer content and about 40 wt % post-industrial content, about 70 wt % post-consumer content and about 30 wt % post-industrial content, about 80 wt % post-consumer content and about 20 wt % post-industrial content, about 85 wt % post-consumer content and about 15 wt % post-industrial content, about 90 wt % post-consumer content and about 10 wt % post-industrial content, about 95 wt % post-consumer content and about 5 wt % post-industrial content, 100% post-consumer content, or any other suitable ratio of post-consumer and post-industrial content. In some examples, depending on the particular blend of post-consumer and post-industrial materials used, the RC pellets may comprise from about 40 to about 85 wt % compounded PVC. In other embodiments, the amount of compounded PVC may differ.

The PC-PVC may be derived from any suitable source. In one example, the PC-PVC is recovered from post-consumer carpet tiles and/or post-consumer roll goods using a mechanical separating apparatus, for example, a shredder, such as described above in connection with FIG. 1D. However, numerous other possibilities are contemplated. The PC-PVC may comprise from about 90 to 100 wt % compounded PVC, for example, about 96% compounded PVC.

In one embodiment, the backing sheet may then be bonded to a separate face construction that has previously been coated with latex precoat and a PVC plastisol layer with an embedded fiberglass scrim. To do so, the PVC plastisol layer and the backing may be heated together in a nip. This roll of carpet may then cut into tiles having various sizes, as desired.

Notably, the present process and resulting backing are able to utilize a greater percentage of post-consumer textile materials, and more particularly, post-consumer textile backing than conventional processes, while reducing (and in some cases eliminating) the need for post-industrial materials, as will be discussed in connection with the examples.

Various aspects of the present invention may be illustrated further with respect to the following examples, which are not intended to be limiting in any manner, and in which all values are approximate.

Example 1

Comparison with Conventional Backings and Processes

Figure 2B:
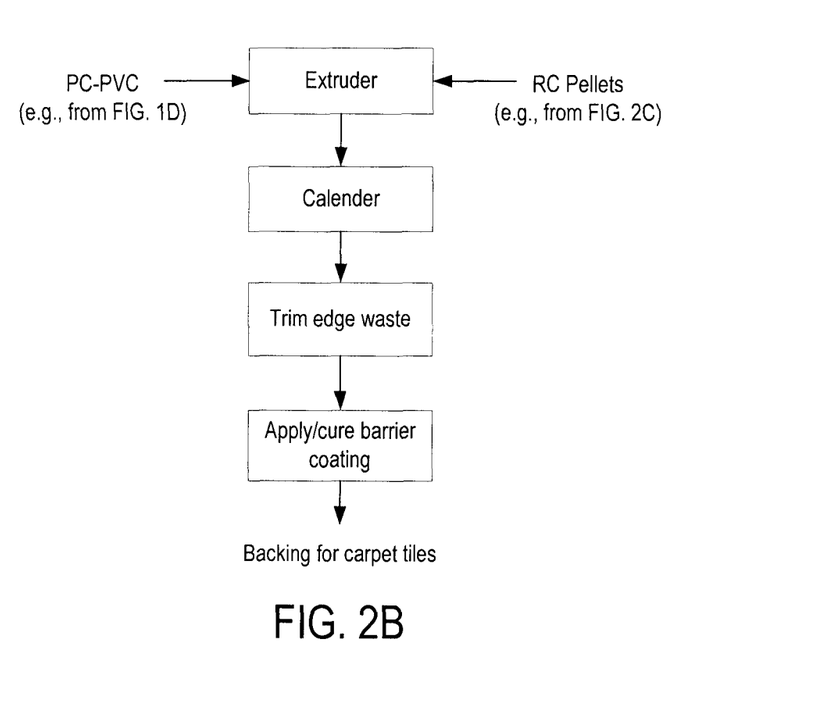
FIG. 2B schematically illustrates an exemplary process or method for making a textile backing (e.g., the carpet tile backing of FIG. 2A), using recycled carpet and/or carpet tile (RC) pellets and PC-PVC.
Figure 2C:
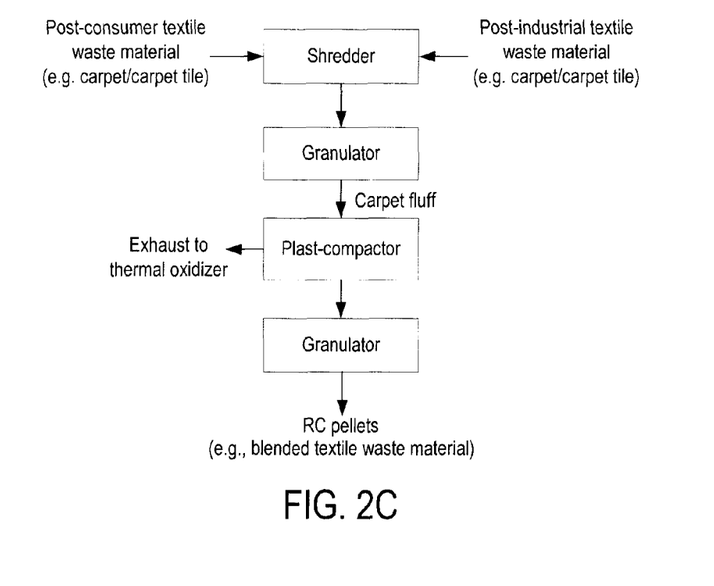
FIG. 2C schematically illustrates an exemplary process or method for making RC pellets, which may be used with the exemplary process of FIG. 2B.
Figure 3:
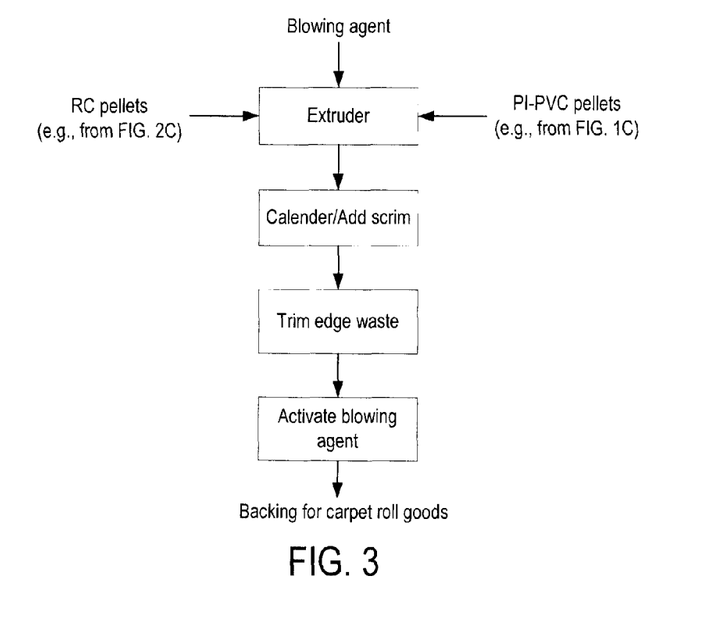
FIG. 3 schematically illustrates an exemplary conventional process or method for making a backing for carpet roll goods.
Figure 4:
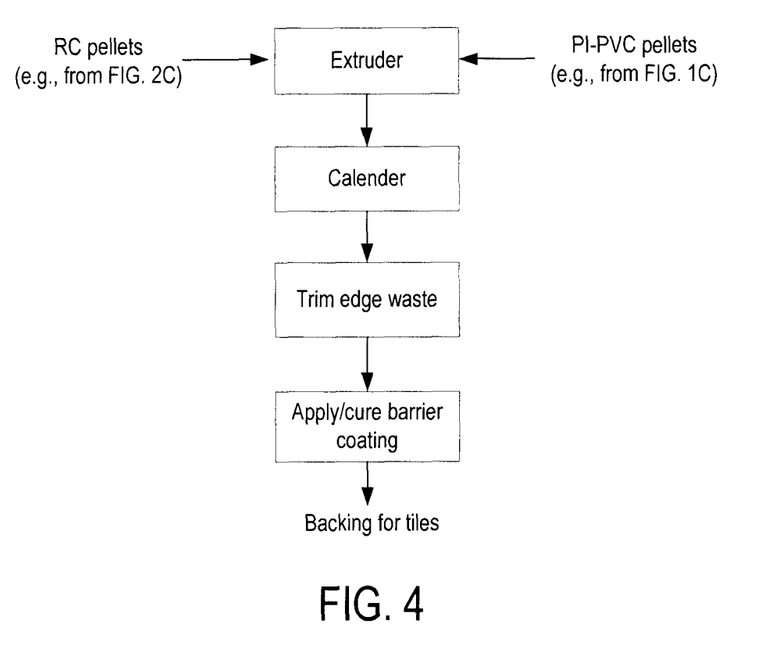
FIG. 4 schematically illustrates an exemplary conventional process or method for making a backing for carpet tiles.

For comparative purposes, and not limitation, FIGS. 3 and 4 schematically illustrate various aspects of exemplary conventional processes for forming a backing for a roll good (FIG. 3) and carpet tile (FIG. 4). In both processes, PI-PVC pellets (FIG. 1C) and RC pellets (FIG. 2C) are fed to an extruder. For a roll good backing, a blowing agent may also be added to the extruder. The remainder of each process is similar to the respective processes described in connection with FIGS. 1B and 2B.

The carpet backing of the present disclosure (e.g., the backing shown in FIG. 1A formed according to a process schematically illustrated in FIG. 1B) offers several advantages over a conventional backing resulting from the exemplary conventional process of FIG. 3. For example, the conventional formulation may include about 59 wt % PI-PVC, about 39 wt % RC pellets, and about 2 wt % blowing agent. In contrast, one exemplary new formulation (e.g., for use with the process of FIG. 1B), may include from about 58 to about 98 wt % PC-PVC, from 0 to about 39 wt % PI-PVC, and about 2 wt % blowing agent.

Thus, as shown in Table 1, the carpet backing of the present disclosure may include far less of the costly PI-PVC and far more PC-PVC than a conventional backing. The post-consumer backing content may be increased from about 3.8-16 wt % to about 5-95 wt % (or greater), while the total post-consumer textile content may be increased from about 19-27 wt % to about 57-95 wt % (or greater). Additionally, in some cases, the virgin plastisol layer (e.g., layer 112 of FIG. 1A) typically used to join the backing 108 to the precoated tufting primary 104 may be able to be eliminated, which may further increase the overall recycled content of the roll good.

TABLE 1

| Component | Conventional carpet backing (wt %) | Present carpet backing (wt %) |
|---|---|---|
| RC pellets | 39 | 0 |
| PI-PVC pellets | 59 | 0-39 |
| PC-PVC | 0 | 59-98 |
| Compounded PVC | 72-89 | 89-95 |
| PC backing content | 3.8-16 | 51-95 |
| PC textile content | 19-27 | 57-95 |

Likewise, the carpet tile backing of the present disclosure (e.g., of FIG. 2A formed according to a process of FIG. 2B) may offer several advantages over a conventional tile backing resulting from the exemplary conventional process of FIG. 4. For example, the conventional formulation may include from about 15-35 wt % PI-PVC and about 65-85 wt % RC pellets. In contrast, one exemplary new formulation (e.g., for use with the process of FIG. 2B), may include from about 90 to about 95 wt % PC-PVC and from 0 to about 5 wt % RC pellets. Thus, the tile backing of the present disclosure may significantly reduce the need for RC pellets, may completely eliminate the need for costly PI-PVC, and may include significantly greater post-consumer content (e.g., up to 100%).

TABLE 2

| Component | Conventional carpet tile backing (wt %) | Present carpet Tile backing (wt %) |
|---|---|---|
| RC pellets | 65-85 | 0-25 |
| PI-PVC pellets | 15-35 | 0 |
| PC-PVC | 0 | 75-100 |
| Compounded PVC | 49-90 | 78-100 |
| PC backing content | 6.5-3 | 61-100 |
| PC textile content | 33-60 | 88-100 |

The processes of FIGS. 1B and 2B may also offer other advantages over the conventional processes illustrated in FIGS. 3 and 4. First, the volume of exhaust that is sent to the thermal oxidizer for treatment during the formation of RC pellets may be reduced because lower quantities of RC pellets are needed. There also may be less stress on the extruder, which may result in lower energy consumption and reduced wear, due to the increased presence of vinyl content and the decreased presence of high softening point, non-PVC materials.

Example 2

Backings for carpet roll goods were prepared using various materials, as indicated in Table 3, where PC-PVC, RC pellet, and PI-PVC are as described above, and PMA-50 is a blowing agent, commercially available from RitChem (Thornwood, N.Y.). The RC pellets were believed to include an about 70/30 blend of post-consumer and post-industrial materials.

TABLE 3

| Sample | PC-PVC (wt %/ lb/hr) | RC pellet (wt %/ lb/hr) | PI-PVC (wt %/lb/hr) | PMA-50 (wt %/ lb/hr) | Total (wt %/lb/hr) |
|---|---|---|---|---|---|
| Control | 0 | 39.4/1559 | 59.1/2339 | 1.50/60 | 100/3958 |
| A | 69.4/2740 | 0 | 29.0/1147 | 1.59/63 | 100/3950 |
| B | 69.2/2740 | 0 | 29.0/1147 | 1.77/70 | 100/3957 |

The various materials were fed into a twin screw extruder with co-rotating two stage screw configuration. The materials were blended into a semi-molten state and extruded through a rope die after vacuum stripping. The semi-molten rope was fed to a three roll calender and processed into a sheet. A nonwoven fiberglass mesh was embedded into the sheet and the sheet was passed through an oven at sufficient temperature to expand the blowing agent. Notably, samples A and B were able to be processed at lower barrel temperatures and slower screw speeds than the control material. More particularly, the screw speed was able to be reduced about 15% from about 340 rpm to about 290 rpm, and the extruder barrel temperature was able to be lowered about 5.5% from about 360° F. to about 340° F., which resulted in an energy savings for the overall process.

The resulting backings were evaluated for physical properties. The results are set forth in Tables 4 and 5. Tensile tear and maximum tensile values were comparable for the control and experimental samples (A and B). The elongation values were slightly reduced for the experimental backings; however, the present inventors have observed that this data point may not be determinative of the performance of the product due to the presence of the embedded fiberglass mesh.

TABLE 4

| | Tensile, Max, MD (ft-lb) | | | Tensile Tear (ft-lb) | | | Elongation (inch) | | |
|---|---|---|---|---|---|---|---|---|---|
| Sample | East | Center | West | East | Center | West | East | Center | West |
| Control | 20.11 | 16.94 | 21.47 | 11.88 | 11.12 | 10.30 | 0.70 | 1.03 | 0.64 |
| A | 17.44 | 17.26 | 18.57 | 10.15 | 10.89 | 11.22 | 0.40 | 0.45 | 0.46 |
| B | 16.11 | 20.65 | 19.09 | 12.39 | 11.85 | 11.64 | 0.39 | 0.34 | 0.36 |

TABLE 5

| Sample | Moisture Penetration, backing only (Impacts to failure) |
|---|---|
| Control | 200-300 |
| A | 3000-4000 |
| B | 500-1000 |

Sample B and the control backing were then bonded to face goods to produce a finished backing for roll goods. The tufted face goods included a latex precoat applied along with a PVC plastisol layer. The PVC plastisol layer was cured and then thermally heated to soften. At the same time, the backing sheet was also thermally heated with infrared heaters. The heated components were nipped together under pressure to form carpet roll goods, which were evaluated for various properties. The results are set forth in Table 6.

TABLE 6

|  | Control | Sample B |
| --- | --- | --- |
| Radiant Panel, ASTM E-648; NFPA 253 (watts/cm$^2$) | 0.51 | 0.55 |
| New York Radiant Panel, NFPA 253 (watts/cm$^2$) | 0.76 | 0.81 |
| Smoke Density, ASTM E-662; NFPA 258 (optical density rating) | 453 | 247 |
| 4 min Flaming Smoke Density, ASTM E-662; NFPA 258 (optical density rating) | 42 | 34 |
| Tuft Bind, ASTM D-1335 | 13.92 | 13.24 |
| Velcro (Industry standard) | 5 | 5 |
| Bundle Wrap (Industry standard) | 98.5 | 98.3 |
| Delamination, ASTM D 3936 (lb/ft$^2$) | 9.68 | 7.89 |
| Chair Test 1MM cycles (Industry standard) | No delamination | No delamination |
| Moisture Penetration (Industry standard) | 10K cycles pass | 10K cycles pass |
| Immersion MD, DDD-C-0095A (%) | −0.151 | −0.151 |
| Immersion CMD, DDD-C-0095A (%) | −0.159 | −0.159 |

As the test data above shows, the experimental sample (sample B) was at least comparable to the control sample for all of the tests conducted. With regards to the smoke density, the experimental sample was significantly superior to the control sample.

Example 3

Backings for carpet tile were prepared using various materials, as indicated in Table 7, where PC-PVC, RC pellet, and PI-PVC are as described above. The RC pellets were believed to include (an about 70/30 blend of post-consumer and post-industrial materials.

TABLE 7

| Sample | PC-PVC (wt %/lb/hr) | RC pellet (wt %/lb/hr) | PI-PVC (wt %/lb/hr) | Total (wt %/lb/hr) |
| --- | --- | --- | --- | --- |
| A | 100/5500 | 0/0 | 0/0 | 100/5500 |
| B | 95/5225 | 5/275 | 0/0 | 100/5500 |
| C | 90/4950 | 10/550 | 0/0 | 100/5500 |
| Control | 0/0 | 85/4675 | 15/825 | 100/5500 |

The materials were fed into a twin screw extruder with a co-rotating two stage screw configuration, blended into a semi-molten state, and extruded through a rope die after vacuum stripping. The semi-molten rope was fed to a three roll calender and processed into a sheet. The resulting sheet was then coated with about 0.5 to about 1.0 oz (dry) of a water based acrylic copolymer barrier coating (e.g., from Stahl Permuthane) that was subsequently cured at a temperature of about 370° F. Notably, samples A, B, and C were able to be processed at lower barrel temperatures and slower screw speeds than the control material. More particularly, the screw speed was able to be reduced about 13% from about 540 rpm to about 470 rpm, and the extruder barrel temperature was able to be lowered about 6% from about 350° F. to about 330° F., which resulted in an energy savings for the overall process.

The resulting backings were evaluated for various physical properties. The results are set forth in Table 8. The tensile tear and elongation values were comparable for the control and experimental samples. The present inventors have determined that these two measurements are often indicative of expected performance during the finishing process.

TABLE 8

| Sample | Tensile, Max, MD (ft-lb) | Tensile Tear (ft-lb) | Elongation (inch) |
| --- | --- | --- | --- |
| A | 8.11 | 1.16 | 0.83 |
| B | 10.39 | 1.4 | 0.74 |
| C | 10.20 | 1.28 | 0.64 |
| Control | 24.37 | 1.70 | 0.71 |

Samples B and C and the control backing were then bonded to face goods including a latex precoat, PVC plastisol layer, and an embedded fiberglass scrim. The PVC plastisol layer was cured and then heated to soften. At the same time, the backing sheets were heated with infrared heaters. The two components were nipped together under pressure to form a carpet roll good, which was subsequently cut into carpet tiles.

The carpet tiles were evaluated for various properties. The results are set forth in Table 9. Samples B and C generally performed at least as well as the control for each of the tests conducted, and samples B and C outperformed the control with regards to the appearance retention grading on the chair test.

TABLE 9

|  | Control | Sample B | Sample C |
| --- | --- | --- | --- |
| Radiant Panel, ASTM E-648; NFPA 253 (watts/cm$^2$) | 0.81 | 0.77 | 0.75 |
| New York Radiant Panel, NFPA 253 (watts/cm$^2$) | 0.87 | 0.87 | 0.87 |
| Smoke Density, ASTM E-662; NFPA 258 (optical density rating) | 235 | 188 | 211 |
| 4 min Flaming Smoke Density, ASTM E-662; NFPA 258 (optical density rating) | 7 | 7 | 11 |
| Tuft Bind, ASTM D-1335 | 15.43 | 14.62 | 13.47 |
| Delamination, ASTM D 3936 (lb/ft$^2$) | No delamination | | |
| Chair Test 20K cycles | 3 | 3.5 | 3.5 |
| Chair Test 50K cycles | 2 | 3 | 3 |

The samples were also evaluated for machine direction (MD) and cross-direction (CMD) stability using the Aachen test (ASTM 7570) and planar stability (Industry Standard). The results are presented in Table 10. The stability of samples B and C was equivalent to the control sample.

TABLE 10

| Position | Control | | | | Sample B | | | | Sample C | | | |
|---|---|---|---|---|---|---|---|---|---|---|---|---|
| | E | EC | CW | W | E | EC | CW | W | E | EC | CW | W |
| MD (in.) | −0.012 | −0.007 | 0.003 | −0.013 | −0.007 | −0.006 | −0.008 | −0.008 | −0.006 | −0.001 | −0.009 | −0.005 |
| CMD (in.) | −0.003 | −0.007 | 0 | 0.001 | −0.001 | −0.002 | −0.006 | 0.001 | 0.005 | −0.002 | 0 | −0.002 |
| Planar Initial | 0.050 D6 | 0.042 D6 | 0.054 D6 | 0.056 D6 | 0.054 D6 | 0.044 D6 | 0.048 D6 | 0.052 D6 | 0.060 D6 | 0.056 D6 | 0.052 D6 | 0.048 D6 |
| Planar Final | 0.088 D7 | 0.088 D7 | 0.090 D7 | 0.092 D7 | 0.060 D6 | 0.048 D6 | 0.060 D6 | 0.058 D6 | 0.068 D6 | 0.060 D6 | 0.095 D7 | 0.097 D7 |

It will be readily understood by those persons skilled in the art that, in view of the above disclosure, the present invention is susceptible of broad utility and application. Although specific embodiments or aspects are disclosed, it will be understood that this disclosure is only illustrative and exemplary of the invention and is made merely for purposes of providing a full and enabling disclosure of the invention and to set forth the best mode of practicing the invention known to the inventors.

Many adaptations, variations, modifications, and equivalent arrangements will be apparent from or reasonably suggested by the present invention and the above detailed description thereof without departing from the substance or scope of the present invention. It will be recognized that various elements discussed with reference to the various embodiments may be interchanged to create entirely new embodiments coming within the scope of the invention. Accordingly, all matter contained in the above description or shown in the accompanying drawings shall be interpreted as illustrative only and is not intended nor is to be construed to limit or otherwise to exclude any such other embodiments, adaptations, variations, modifications, and equivalent arrangements of the present invention.

What is claimed is:

1. A method of making a textile backing from post-consumer textile backing waste and, optionally, blended textile waste, wherein the blended textile waste includes at least one of post-consumer textile waste and post-industrial textile waste, the method comprising:
   forming the post-consumer textile backing waste, wherein forming the post-consumer textile backing waste comprises
      shredding post-consumer textile waste, wherein the post-consumer textile waste comprises fibers joined to post-consumer backing, the post-consumer backing comprising compounded polyvinyl chloride, wherein shredding the post-consumer textile waste at least partially separates the fibers from the post-consumer backing, and
      removing at least about 80 wt % of the fibers from the shredded post-consumer textile waste to form the post-consumer textile backing waste, so that the post-consumer textile backing waste comprises at least about 80 wt % compounded polyvinyl chloride, wherein the post-consumer textile backing waste is in a shredded condition;
   optionally and separately densifying the optional blended textile waste, wherein densifying the blended textile waste comprises at least one of compacting and pelletizing the optional blended textile waste;
   delivering the post-consumer textile backing waste in the shredded condition to an extruder, wherein the post-consumer textile backing waste is delivered to the extruder in the shredded condition without being granulated or densified; and
   extruding a mixture comprising from about 75 to about 100 wt % of the post-consumer textile backing waste and from 0 to about 25 wt % of the optional blended textile waste to form the textile backing.

2. The method of claim 1, wherein removing at least about 80 wt % of the fibers from the shredded post-consumer textile waste to form the post-consumer textile backing waste comprises removing at least about 85 wt % of the fibers, so that the post-consumer textile backing waste comprises at least about 85 wt % compounded polyvinyl chloride.

3. The method of claim 1, wherein removing at least about 80 wt % of the fibers from the shredded post-consumer textile waste to form the post-consumer textile backing waste comprises removing at least about 90 wt % of the fibers, so that the post-consumer textile backing waste comprises at least about 90 wt % compounded polyvinyl chloride.

4. The method of claim 1, wherein removing at least about 80 wt % of the fibers from the shredded post-consumer textile waste to form the post-consumer textile backing waste comprises removing at least about 95 wt % of the fibers, so that the post-consumer textile backing waste comprises at least about 95 wt % compounded polyvinyl chloride.

5. The method of claim 1, further comprising calendaring the extruded mixture.

6. The method of claim 5, further comprising applying a barrier coating to the calendared mixture.

7. The method of claim 1, wherein the mixture comprises from about 90 to 100 wt % post-consumer textile backing waste and from 0 to about 10 wt % blended textile waste.

8. The method of claim 1, wherein the post-consumer textile backing waste comprises at least about 85 wt % post-consumer backing.

9. The method of claim 1, wherein the post-consumer textile backing waste comprises at least about 90 wt % post-consumer backing.

10. The method of claim 1, wherein the post-consumer textile backing waste comprises greater than about 95 wt % post-consumer backing.

11. The method of claim 1, wherein the post-consumer textile waste comprises at least one of carpet and carpet tiles.

12. The method of claim 1, wherein the post-industrial textile waste comprises at least one of carpet and carpet tiles.

13. The method of claim 1, wherein the textile backing comprises a carpet tile backing.

14. The method of claim 1, wherein the textile backing comprises from about 78 to 100 wt % compounded polyvinyl chloride.

15. A method of making a textile backing, the method comprising:

forming post-consumer textile backing waste, wherein forming the post-consumer textile backing waste comprises
- shredding post-consumer textile waste, wherein the post-consumer textile waste comprises fibers and post-consumer backing, the post-consumer backing comprising compounded polyvinyl chloride, and wherein shredding the post-consumer textile waste at least partially separates the fibers from the post-consumer backing, and
- removing at least about 90% of the fibers from the shredded post-consumer textile waste to form the post-consumer textile backing waste, so that the post-consumer textile backing waste comprises at least about 90% compounded polyvinyl chloride, wherein the post-consumer textile backing waste is in a shredded condition;

optionally and separately densifying blended textile waste, wherein densifying the blended textile waste comprises at least one of compacting and pelletizing the blended textile waste;

delivering the post-consumer textile backing waste in the shredded condition and the optional densified blended textile waste to an extruder to form a textile backing composition, wherein the post-consumer textile backing waste is delivered to the extruder in the shredded condition without being granulated or densified;

extruding the textile backing composition; and calendering the textile backing composition to form the textile backing.

16. The method of claim 15, wherein the blended textile waste includes at least one of post-consumer textile waste and post-industrial textile waste.

17. The method of claim 15, wherein the textile backing comprises from about 78 to 100 wt % compounded polyvinyl chloride.

18. The method of claim 15, wherein the textile backing comprises from about 61 to 100 wt % post-consumer content.

19. A method of making a textile backing, the method comprising:
- shredding post-consumer textile waste, wherein the post-consumer textile waste comprises fibers joined to post-consumer backing, the post-consumer backing comprising compounded polyvinyl chloride, wherein shredding the post-consumer textile waste at least partially separates the fibers from the post-consumer backing, and
- removing at least about 85 wt % of the fibers from the shredded post-consumer textile waste to form post-consumer textile backing waste, such that the post-consumer textile backing waste comprises at least about 85% compounded polyvinyl chloride;
- delivering the shredded post-consumer textile backing waste to an extruder, wherein the post-consumer textile backing waste is delivered to the extruder in the shredded condition without being granulated or densified;
- extruding the at least about 85 wt % compounded polyvinyl chloride from the shredded post-consumer textile backing waste; and
- calendering the extruded at least about 85 wt % compounded polyvinyl chloride to form the textile backing.

20. The method of claim 19, wherein the post-consumer textile waste comprises at least one of post-consumer carpet and post-consumer carpet tiles.

21. The method of claim 19, wherein the textile backing comprises from about 78 to 100 wt % compounded polyvinyl chloride.

22. The method of claim 19, wherein the textile backing comprises from about 61 to 100 wt % post-consumer content.

* * * * *